(12) United States Patent
Ji et al.

(10) Patent No.: US 10,839,802 B2
(45) Date of Patent: Nov. 17, 2020

(54) PERSONALIZED PHRASE SPOTTING DURING AUTOMATIC SPEECH RECOGNITION

(71) Applicant: MOTOROLA MOBILITY LLC, Chicago, IL (US)

(72) Inventors: Zhengping Ji, Hinsdale, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 157 days.

(21) Appl. No.: 16/221,331

(22) Filed: Dec. 14, 2018

(65) Prior Publication Data

US 2020/0193981 A1    Jun. 18, 2020

(51) Int. Cl.
G06F 40/30 (2020.01)
G06F 40/284 (2020.01)
G10L 15/22 (2006.01)
G10L 15/08 (2006.01)

(52) U.S. Cl.
CPC ............. *G10L 15/22* (2013.01); *G10L 15/08* (2013.01); *G10L 2015/088* (2013.01); *G10L 2015/223* (2013.01); *G10L 2015/228* (2013.01)

(58) Field of Classification Search
CPC ............................... G06F 40/30; G06F 40/284
See application file for complete search history.

(56) References Cited

U.S. PATENT DOCUMENTS

| | | | | |
|---|---|---|---|---|
| 4,173,041 A * | 10/1979 | Dvorak | ..................... | G06F 9/26 712/226 |
| 6,317,707 B1 * | 11/2001 | Bangalore | ............. | G06F 40/284 704/9 |
| 7,555,287 B1 * | 6/2009 | Heinonen | ............... | H04W 4/12 455/41.2 |
| 2003/0028566 A1 * | 2/2003 | Nakano | ............. | G06F 16/90344 715/234 |
| 2004/0064303 A1 * | 4/2004 | Bangalore | ............ | G06K 9/6218 704/1 |
| 2006/0005123 A1 * | 1/2006 | Igata | ....................... | G06F 16/31 715/256 |
| 2015/0269142 A1 * | 9/2015 | Antebi | .................... | G06F 40/35 704/9 |
| 2016/0232211 A1 * | 8/2016 | Ye | ....................... | G06F 16/2455 |
| 2017/0371867 A1 * | 12/2017 | Hughes | ................... | G06F 40/51 |
| 2018/0203757 A1 * | 7/2018 | Akune | ................ | G06F 11/3476 |

* cited by examiner

*Primary Examiner* — Shreyans A Patel
(74) *Attorney, Agent, or Firm* — Yudell Isidore PLLC

(57) ABSTRACT

A method and data processing device for receiving, at a data processor, data that includes at least one personalized phrase. The method includes extracting a personalized phrase from received data. The method includes tracking, via an assigned phrase counter, each occurrence of the personalized phrase in the received data and subsequently received data. The method includes periodically comparing a value of the assigned phrase counter to pre-established count thresholds to determine when a count of the personalized phrase reaches at least one of the pre-established count thresholds. The method includes storing the personalized phrase to a phrase database and linking the personalized phrase to the one or more general phrases in the phrase database. The method includes selectively triggering a contextual response to the data and executing, by the data processor, the corresponding operation. The method includes outputting the contextual response to an output device.

20 Claims, 8 Drawing Sheets

PERSONALIZED PHRASE SPOTTING DURING AUTOMATIC SPEECH RECOGNITION

BACKGROUND

1. Technical Field

The present disclosure generally relates to speech recognition and in particular to a method and electronic device for automatic speech recognition.

2. Description of the Related Art

Automatic speech recognition (ASR) is the technology that enables the recognition and translation of spoken language into text by computers or mobile devices. ASR utilizes a voice user interface to communicate with a computing device. Voice user interfaces associated with mainstream use of ASR are typically included in smart speakers, smart TVs, and other smart devices.

Most of the existing ASR is based on cloud solution, where the data is sent to the cloud infrastructure to get processed. The use of ASR on devices remains a challenge due to computational complexities and limited computing capabilities. Also, the usage of ASR devices in real-world environments are impeded by linguistic differences among individuals. Further, the more complex the inquiries and transactions are, the more challenging the transactions are to automate.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
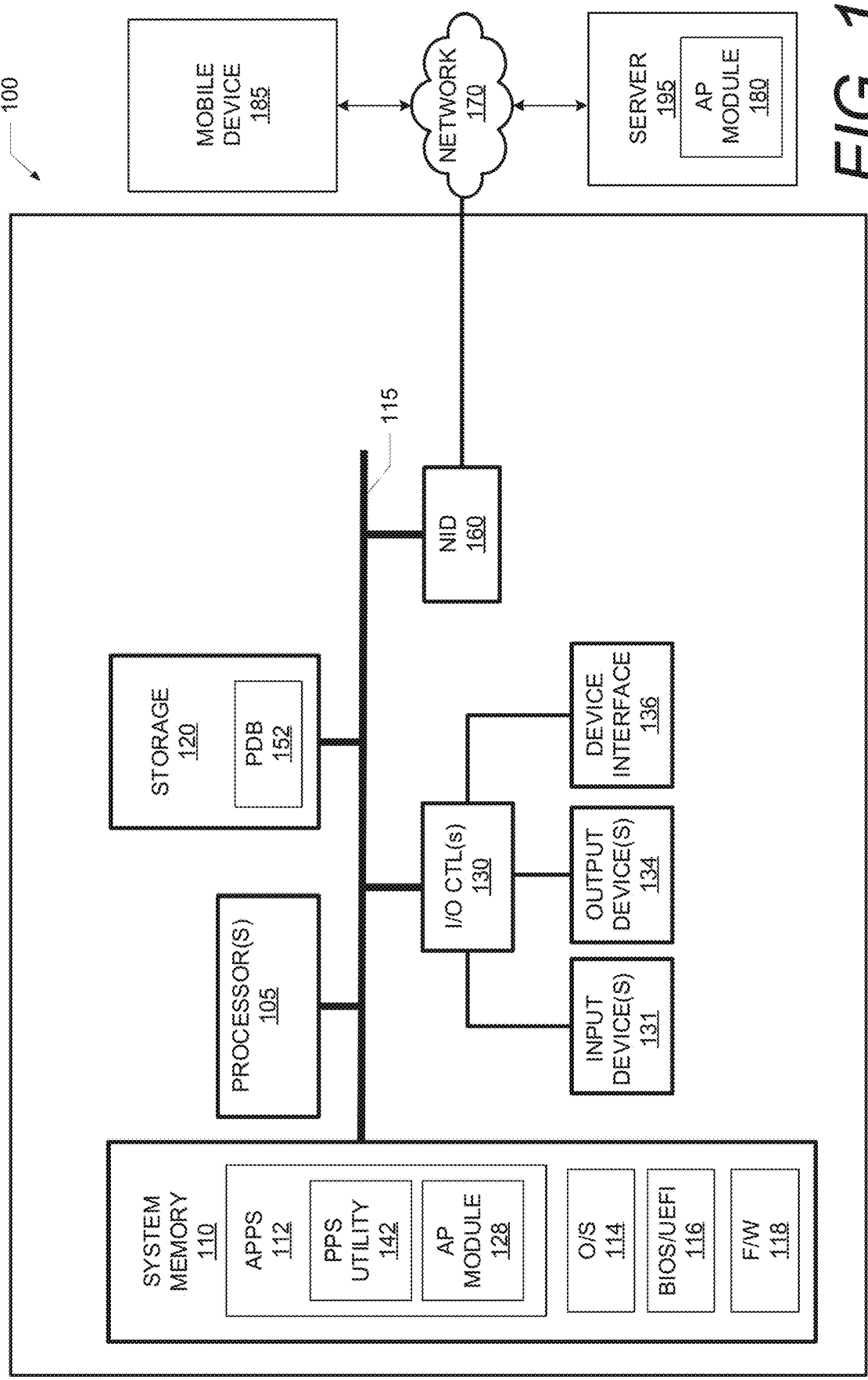
FIG. 1 provides a block diagram representation of an example data processing system within which certain aspects of the disclosure can be practiced, in accordance with one or more embodiments.

Disclosed are a method, a data processing device, and a computer program product for detecting and responding to personalized phrases during active and passive data input. The method includes receiving, at a data processor, data that includes at least one personalized phrase. The method includes extracting a personalized phrase from the received data and storing the personalized phrase in a buffer having an assigned phrase counter. The method further includes tracking, each occurrence of the personalized phrase in the received data and subsequently received data, and incrementing the assigned phrase counter for each occurrence of the personalized phrase. The method further includes periodically comparing a value of the assigned phrase counter to a plurality of pre-established count thresholds in order to determine when a count of the personalized phrase reaches at least one of the pre-established count thresholds. The method includes linking, within a phrase database, each personalized phrase to a contextual response that includes, at least in part, a corresponding operation that correlates to the received data and the personalized phrase. The method further includes linking the personalized phrase to the one or more general phrases in the phrase database, wherein the personalized phrase correlates to one or more general phrases. The method includes selectively triggering the contextual response to the data, the contextual response including, at least in part, the corresponding operation that is linked to the personalized phrase. The method further includes executing, by the data processor, the corresponding operation and outputting the contextual response to an output device.

According to one embodiment, a data processing device comprises a listening device that receives audio data and a processor that is communicatively coupled to the listening device. The processor executes a personalized phrase spotting utility, which configures the processor to receive, at a data processor, the audio data, which includes at least one personalized phrase. The processor extracts a personalized phrase from the received audio data. The processor stores the personalized phrase in a counting buffer having an assigned phrase counter. The processor further tracks, via the assigned phrase counter, each occurrence of the personalized phrase by incrementing the assigned phrase counter for each occurrence of the personalized phrase in the received data and subsequently received data. The processor periodically compares a value of the assigned phrase counter to a plurality of pre-established count thresholds to determine when a count of the personalized phrase reaches at least one of the pre-established count thresholds. The processor links each of the personalized phrases to a contextual response that includes, at least in part, a corresponding operation that correlates to the received data and the personalized phrase. The processor also links the personalized phrase to the one or more general phrases in a phrase database when the personalized phrase correlates to one or more general phrases. The processor selectively triggers the contextual response to the data. The contextual response includes, at least in part, the corresponding operation that is linked to the personalized phrase. The processor executes the corresponding operation and outputs the contextual response to an output device.

According to another embodiment, a computer program product includes a computer readable storage device and program code on the computer readable storage device. When executed within a processor associated with a device, the program code enables the device to provide the various functionality presented in the above-described method processes.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, for example data processing system (DPS) 100, within which one or more of the described features of the various embodiments of the disclosure can be implemented. For example, a data processing system may be a handheld device, a personal computer, such as a laptop, tablet, or desktop computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). Stored within storage 120 is phrase database (PDB) 152. In one embodiment, PDB 152 is a database that is remote to mobile device 185. PDB 152 can be utilized to minimize storing phrases on mobile device 185.

Storage 120 can be a hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118. The various software and/or firmware modules have varying functionality when their corresponding program code is executed by processor(s) 105 or other processing devices within DPS 100.

DPS 100 also includes personalized phrase spotting (PPS) utility 142. PPS utility 142 may be provided as an application that is optionally located within system memory 110 and executed by processor 105. Within this embodiment, processor 105 executes PPS utility 142 to provide the various methods and functions described herein. For simplicity, PPS utility 142 is illustrated and described as a stand-alone or separate software/firmware/logic component, which, when executed by processor, provides specific functions and methods described herein. However, in at least one embodiment, PPS utility 142 may be a component of, may be combined with, or may be incorporated within OS 114, and/or with/within one or more applications 112. Within system memory 110, AP module 128 is a software module utilized to analyze and manipulate received audio data.

DPS 100 further comprises a network interface device (NID) 160. NID 160 enables DPS 100 to communicate and/or interface via a communication network with other devices, services, and components located external (remote) to DPS 100. These devices, services, and components can interface with DPS 100 via an external network, such as example network 170, using one or more communication protocols. Network 170 can be a local area network, wide area network, personal area network, signal communication network, and the like. In one example, a wide area network is the Internet. Further, the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network.

DPS 100 further includes one or more input/output (I/O) controllers 130, which support connection by, and processing of signals from, one or more connected input device(s) 131, such as a keyboard, mouse, touch screen, or microphone. I/O controllers 130 also support connection to and forwarding of output signals to one or more connected output devices 134, such as a display and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to additional devices, for example, a compact disk (CD), digital video disk (DVD), flash drive, or flash memory card. In one or more embodiments, device interfaces 136 can further include General Purpose I/O interfaces, such as an Inter-Integrated Circuit (I²C) Bus, System Management Bus (SMBus), and peripheral component interconnect (PCI) buses.

In one or more embodiments, DPS 100 communicates with server 195. Server 195 can have similar component makeup and configuration to DPS 100. DPS 100 and mobile device 185 are connected to server 195 via network 170. Server 195 can include a remote AP module 180. In one or more embodiments, server 195 transmits data to and receives data from DPS 100 and mobile device 185. DPS 100 and mobile device 185 can utilize remote AP module 180 as a remote processing module. AP module 180 can execute from server 195 and generate a respective response to mobile device 185 via network 170.

Figure 2:
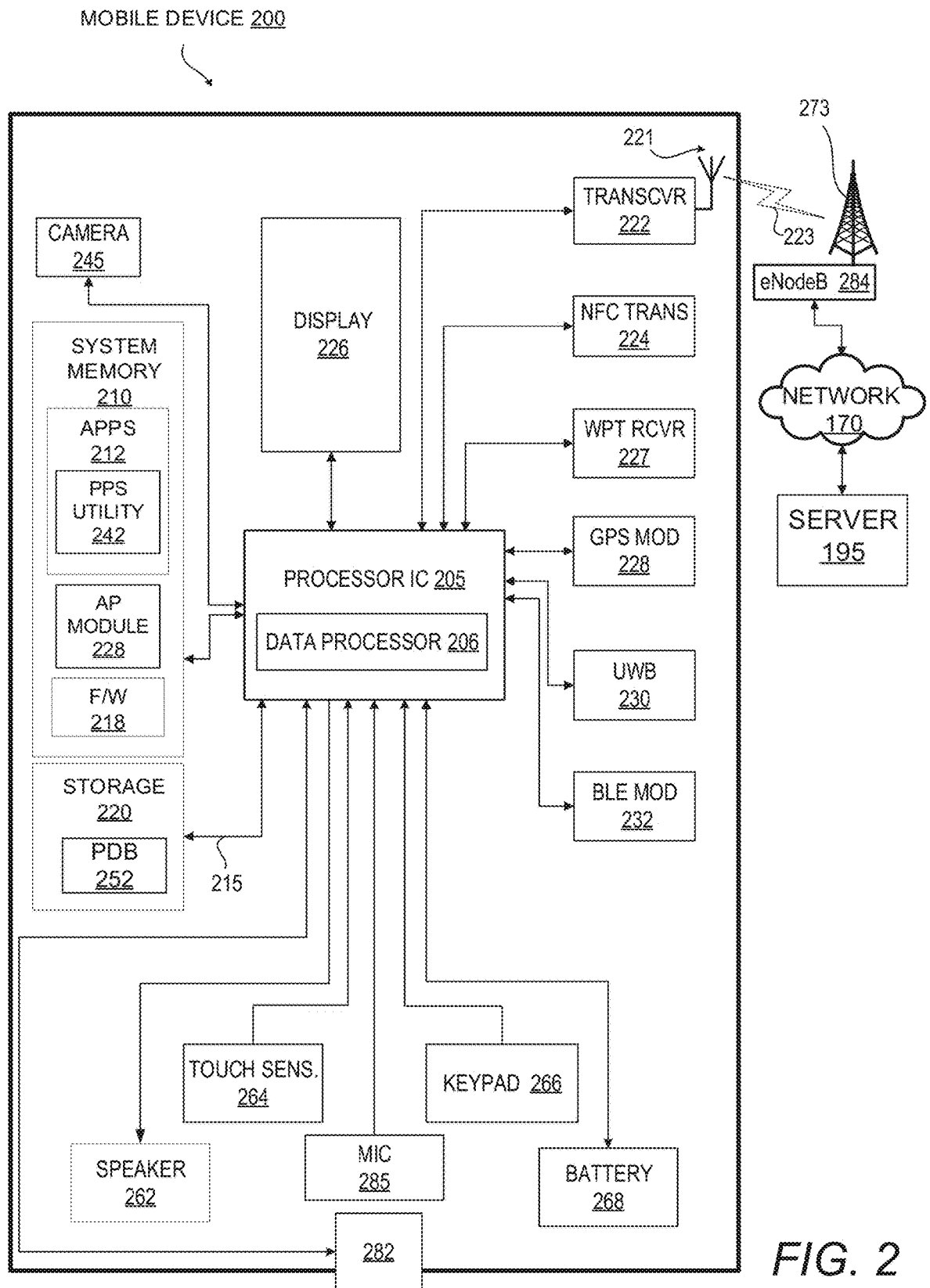
FIG. 2 illustrates a mobile device within which certain aspects of the disclosure can be practiced, in accordance with one or more embodiments.

In the description of the following figures, reference is also occasionally made to specific components illustrated within the preceding figures, utilizing the same or similar reference numbers from the earlier figures. With reference now to FIG. 2 which illustrates an example mobile device 200, within which certain aspects of the disclosure can be practiced, in accordance with one or more embodiments. Mobile device 200 can be utilized as mobile device 185 in FIG. 1, and can have similar component makeup and configuration to mobile device 185. For simplicity, mobile device 185 is interchangeably referred to hereinafter as mobile device 200. Mobile device 200 includes at least one processor integrated circuit (IC) 205. Processor IC 205 includes data processor 206. Processor IC 205 is referred to, in totality, herein as "processor" 205. Processor 205 is coupled to system memory 210 and non-volatile storage 220 via a system communication mechanism, such as system interconnect 215. Stored within storage 220 is PDB 252. One or more software and/or firmware modules can be loaded into system memory 210 during operation of mobile device 200. Specifically, system memory 210 includes applications 212 and firmware (F/W) 218. In one embodiment, system memory 210 includes therein a plurality of modules for processing audio input, including audio processing (AP) module 228. System memory 210 may also include basic input/output system and an operating system (not shown).

Processor 205 supports connection by and processing of signals from one or more connected input/output devices such as display 226, camera 245, speaker 262, touch sensor 264, keypad 266, microphone 285. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes antenna 221 connected to transceiver 222 to enable receiving and transmitting data when in communication with one or more base stations. Transceiver 222 allows for wide-area or local wireless communication, via wireless signal 223, communicated via antenna 273 between mobile device 200 and evolved node B (eNodeB) 284. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 222, antenna 221, wireless signal 223, antenna 273, and eNodeB 284.

In one embodiment, other devices within mobile device 200 utilize antenna 221 to send and/or receive signals in the form of radio waves. These devices include near field communication transceiver (NFC TRANS) 224, wireless power transfer receiver (WPT RCVR) 227, global positioning system module (GPS MOD) 228, ultra-wideband (UWB) transceiver 230, and Bluetooth Low Energy (BLE) module 232, all of which are communicatively coupled to processor 205. While presented as a single antenna, it is appreciated that multiple different antenna modules can be provided within mobile device 200 to support communication via the various different types of communication technology. For example, GPS MOD 228 communicatively couples to antenna 221 to receive location data. UWB transceiver 230 communicatively couples to antenna 221 and uses radio technology that can operate with very low energy levels to send and/or receive high-bandwidth communications within an approximated range. Further, BLE MOD 232 may connect to antenna 221, enabling mobile device 200 and/or components within mobile device 200 to communicate and/or interface with other devices, services, and components that are located external to mobile device 200 and use Bluetooth technology.

As provided by FIG. 2, mobile device 200 additionally includes PPS utility 242 which executes on processor 205 to enable the processing of data received from camera 245, GPS MOD 228, BLE MOD 232, and transceiver 222. In at least one embodiment, PPS utility 242 may be a component of, may be combined with, or may be incorporated within one or more applications 212. Additional aspects of PPS utility 142 and the functionalities thereof, are presented within the description of FIGS. 3-8. The software and/or firmware modules provide varying functionality when their corresponding program code is executed by processor 205 or by secondary processing devices within mobile device 200. For example, camera 245, GPS MOD 228, BLE MOD 232, and transceiver 222 can contribute to passive data and the analysis of active data as received by mobile device 200. In one embodiment, personalized phrase database 252 is populated, in part, based on the repeat occurrence of person/place pictures (face/figure recognition data), GPS location data, Bluetooth signals, and/or radio-frequency identification (RFID) signals.

Mobile device 200 is presented as a wireless communication device. As a wireless device, mobile device 200 can communicate data over network 170. For example, mobile device 200 transmits data to and/or receives data from remote PDB 152 within DPS 100. In an alternate embodiment, a copy of PDB 252 is also stored, or alternatively stored within a remote database. For example, a copy of PDB 252 is stored on server 195 and/or PDB 152 of DPS 100.

As will be discussed further, processor 205 provides data to and retrieves data from PDB 252, within non-volatile storage 220. PDB 252 and/or remote PDB 152 may provide a common, unified or central database for the collection of personalized phrases identified at specified coordinates and/or data points that are associated with response signals detected by camera 245, GPS MOD 228, BLE MOD 232, and transceiver 222. Mobile device 200 and components thereof are further discussed in FIG. 3.

Figure 3:
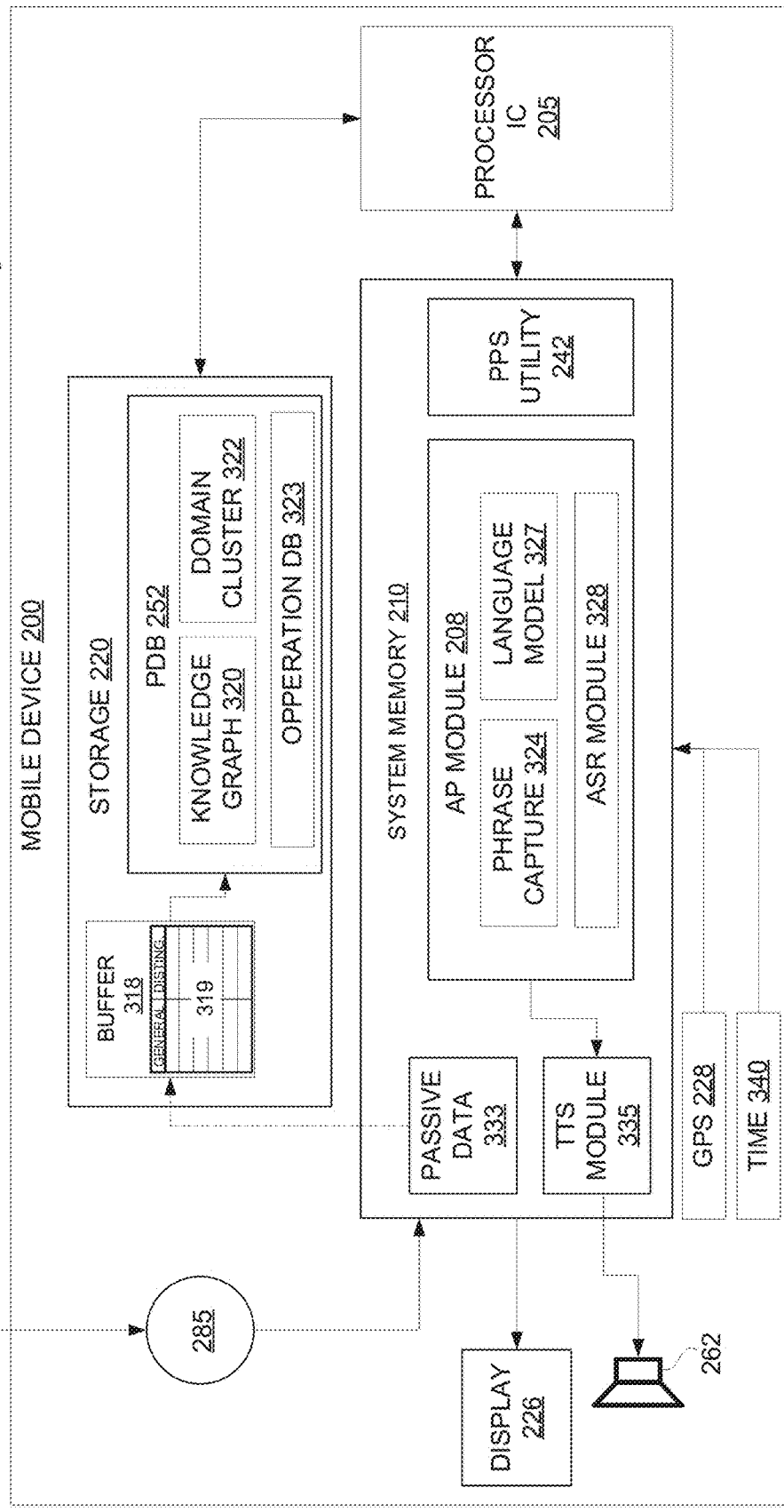
FIG. 3 illustrates a block diagram of an audio processing system for use to identify phrases received in a vicinity of the mobile device of FIG. 2, in accordance with one or more embodiments.

With reference now to FIG. 3, there is illustrated a block diagram of an audio processing system for use to identify phrases received in a vicinity of the mobile device of FIG. 2, in accordance with one or more embodiments. Audio processing system 300 generally includes mobile device 200 which receives audio content 310. Mobile device 200 includes processor 205, system memory 210, storage 220, display 226, speaker 262, GPS 228, time counter 340, and microphone.

System memory 210 includes AP module 208, passive data 333, and text to sound module 335. AP module 208 is comprised of submodules, phrase capture module 324, language model module 327, and automatic speech recognition (ASR) module 328. The submodules 324, 327, 328 are utilized to spot phrases within audio content 310, recognize language texts from audio content 310, and re-train an existing language model to adapt to the linguistical specifics of one or more users. System memory 210 also includes PPS utility 242, which enables processor 205 to execute the functionalities of the submodules and enables the submodules to transmit changes associated with linguistical specifics to storage 220. Storage 220 includes buffer 318 and PDB 252. Further PDB 252 includes knowledge graph 320 and domain cluster 322.

Microphone 285, connected to processor 205, receives audio content 310. Audio content 310 can be both passive and active audible information, where the passive audible information is information retrieved from a voicemail or voice notes stored to mobile device 200. Active audible information, such as audio content is audible information detected in an environment local to mobile device 200. Active audio content can be, for example, audible data collected during a phone conversation or audible information collected during a passing conversation in the area local to mobile device 200. Personalized phrases can be extracted from audio content 310 when audible content is an audio file, and the audio file can be a sample of audio content collected from an area in the vicinity of (or proximate to) microphone 285.

In operation, utilizing the instructions of PPS utility 242, processor 205 enables mobile device 200 to update and customize PBD 252. In detail, processor 205 enables mobile device 200 to: (i) identify personalized phrases based on knowledge graph 320 and/or domain cluster 322, given a corresponding user experience; (ii) replace the one or more general phrases in PDB 252 with a personalized phrase and store the personalized phrase to update PDB 252, and (iii) based on the replacement of the general phrase with the personalized phrase, retrain audio processing module 208 to utilize the personalized phrase in place of the general phrase in the spotting list of phrases. Audio content 310 is received at microphone 285. Phrase capture module 324 and language model module 327 execute on processor 205 and process audio content 310. Utilizing the received audio content 310, phrase capture module 324 and language model module 327 identify and detect distinguishing phrases from within the received audio content that are contextually similar to general phrases in the spotting list of phrases. PDB 252 is first populated with general phrases which form the list of spotting phrases. Processor 205 automatically activates ASR module 328 in response to identifying the one or more general phrases from among the list of spotting phrases. Distinguishing phrases, also referred to herein as personalized phrases can be, for example, another word a user utilizes to describe a noun. In one embodiment, processor 205 identifies the spotting phrase verbatim. In another embodiment, processor 205 identifies the root word of the spotting phrase. For example, in response to a user speaking the word "raining", processor 205 can identify the received audio content relates to "rain". For clarity, phrase capture module 324 detects phrases in buffer 318 and/or PDB 252. When executed, ASR module 328 converts each word received from audio content 310 to text, and each word is analyzed by processor 205. Consequently, ASR module 328 is more complex and computing/power expensive in comparison to phrase capture module 324. ASR module 328 is selectively triggered by phrase capture module 324.

In response to the received data and any subsequently received data having at least one distinguishing phrase/personalized phrase that is contextually similar to a general phrase in the list of spotting phrases, processor 205 signals AP module 208 to listen for more personalized phrases.

In one embodiment, phrase capture module 324 utilizes a spotting phrase decoder to retrieve a phrase from audio content 310 and compares the recently retrieved phrase to previously collected audio content. The spotting decoder utilizes an acoustic model to compare linguistics identified in audio content 310 to nearest known sounds stored in language model module 327. In another embodiment phrase capture module 324 translates the audio content 310 to transcript text and compares the phrase to existing transcribed and/or stored phrases in buffer 318 and PDB 252.

Language model module 327 identifies phrases captured by phrase capture module 324 and compares the phrases to an existing language model to determine when the phrase is a new phrase and when the phrase has a different pronunciation from a pronunciation of an existing similar (or same) phrase. Language model module 327 compares dialect and linguistics to identify phonetics that cause the word to sound different from an existing language model. Language model module 327 further retrains the existing language model by updating the pronunciation of the phrase for one or more particular users. Updating the pronunciation in language model module 327 enables phrase capture module to quickly identify phrases from audio content 310. Further, processor 205 stores, with the personalized phrases in PDB 252, one or more acoustic characteristics of a voice of a respective user. Accordingly, ASR module 328, in association with PDB 252 and coordinating with language model module 327, can identify when a respective user is producing audio content, and can generate a personalized contextual response unique to the user producing audio content 310. In one or more embodiments, language model module 327 is stored on a server, for example, server 195 and is accessible to mobile device 200 via network 170.

PPS utility 242 enables processor 205 to build PDB 252 from a compilation of resources. PDB 252 initially receives a collection of general phrases. The general phrases are a basic group of common phrases. In at least one embodiment, each PDB (252) begins with the same group of general phrases. PPS utility 242 further builds and personalizes PDB 252 from two primary resources, passive data 333 and audio content 310. Passive data 333 can be, for instance, data collected during a networked search, data retrieved from text messaging, and applications (212) associated with mobile device 200. Passive data 333 can also be retrieved from resources, devices, and applications that are communicatively connected to mobile device 200. For example, passive data can be retrieved from GPS module 228. In response to identifying personalized phrases in audio content 310 and passive data 333 more than N number of times in a predetermined time span, the personalized phrase is added to PDB 252. For one example, based on audio content 310, a phrase "Chicago" is detected N number of times in user audio over a certain time span. As a result, the word/phrase "Chicago" is extracted as a personalized phrase and added to buffer 318. In another example of passive data 333, based on location data from GPS module 228, the processor (or phrase capture module 324) determines that a user goes to a certain location N number of times (wherein N is a determinable number) in a certain time span. The location, for instance is "Union Station". The phrase "Union Station" is extracted as a personalized phrase and added to buffer 318.

More specifically, each time phrase capture module 324 identifies a phrase, the phrase is compared to phrases in buffer 318. Buffer 318 has multiple entries of distinguishing phrases being monitored and/or tracked. Each buffer entry 319 has a corresponding counter that incrementally tracks a number of occurrences of the distinguishing phrase that is stored within buffer entries 319. When a same phrase as a distinguishing phrase that is stored in one of the buffer entries 319 is detected, a corresponding counter value for that buffer entry is increased.

In response to the phrase being nonexistent in buffer 318, the phrase is added to buffer 318. In response to the phrase existing in the counting buffer, the assigned phrase counter increments the count of the phrase each time the phrase is identified in audio content 310 and/or passive data 333. Processor 205 periodically compares a counter value for each phrase within buffer 318 to a plurality of pre-established count thresholds. The plurality of pre-established count thresholds can be, for example, an adding threshold having a first value and a merging threshold having a second value. The adding threshold (first value) is based on detection, within a predetermined length of time, of a pre-established number of occurrences of the personalized phrase in the audio content. The merging threshold (second value) is based on a pre-established correlation value between the personalized phrase and one or more of the general phrases in PDB 252. Each of the adding threshold and the merging threshold is a determinable threshold. In one embodiment, the adding threshold is greater than or equivalent to the merging threshold. Therefore, the personal phrase replaces the general phrase as soon as the personal phrase is added to PDB 252 because the respective merging threshold is exceeded. In another embodiment, adding threshold is less than the merging threshold. The adding and merging threshold can also be time and location dependent. Time counter 340 tracks a time elapsed from each occurrence of the personalized phrase to the pre-established number of occurrences. Time counter 340 utilizes a time stamp for each occurrence of the personalized phrase. The time stamp can be stored along with the personalized phrase in buffer 318 until the pre-determined time span has expired.

In response to the assigned phrase counter exceeding the pre-established adding threshold, processor 205 generates a signal to PDB 252 that triggers storing of the personalized phrase. When the personalized phrase is added to PDB 252, processor 205 identifies one or more general phrases that correlate to the personalized phrase. Processor 205 assigns a pre-established correlation value to the personalized phrase and the one or more corresponding general phrases. The correlation value is a quantitative assessment between associative words within PDB 252. The correlation value can be, for example, a formulated value generated based on how synonymous two words are in meaning and/or definition.

In one embodiment, when the assigned phrase counter exceeds the merging threshold (second threshold), the personalized phrase replaces the one or more correlating general phrases in PDB 252. Knowledge graph 320 and domain cluster 322 are utilized to identify the degree of correlation between the personalized phrase and one or more general phrases. The description of FIG. 4 and FIG. 5 describes knowledge graph 320 and domain cluster 322, respectively, in more detail. In response to a personalized phrase replacing one or more general phrases, the personalized phrase is adapted as a general phrase. In one embodiment, the personalized phrase (now relabeled as a general phrase) can be replaced by a subsequent personalized phrase.

Processor 205 updates and retrains AP module 208 based on modifications to PDB 252. The spotting phrases are updated and/or modified each time PDB 252 is updated and/or modified. The spotting phrases enable AP module 208 to listen for the personalized phrases. For example, in response to PDB 252 replacing one or more general phrases in PDB 252 (such as with a frequently utilized personalized phrase), the one or more general phrases are also replaced in language model module 327. Language model module 327 also modifies any linguistic updates to the corresponding phrase. Adapting the linguistics changes in language model module 327 advantageously minimizes the use of additional analysis resources when phrase capture 324 is identifying and/or when extracting phrases from audio content 310.

In one embodiment, successful detection of each general phrase and personalized phrase in PDB 252 will activate ASR module 328. ASR module 328 then recognizes the whole audio content 310 to convert the spoken word to the text transcription. The extracted text from ASR module 328 is further analyzed, utilizing language model module 327 to determine user intent. For example, "rain" is a stored word/phrase in PDB 252, and the user states "Is it going to rain this weekend?". Phrase capture module 324 detects "rain" in user audio. Processor 205 triggers ASR module 328 to identify the entirety of the statement by converting the statement to text. The text statement is provided to language model module 327. Language model module 327 compares phrases and linguistics of the statement to stored phrases and linguistics, to determine that the intent of the statement is that the user wants to know the weather this weekend.

In one embodiment, each general phrase and personalized phrase in PDB 252 can be directly linked to a contextual response that includes, at least in part, a corresponding operation that correlates to the received data and the personalized phrase. The corresponding operation, stored in operation database 323, can, for example, include links to websites, coupons, directions, schedules, notes, and phone numbers associated with the personalized phrase. In response to the personalized phrase being added to PDB 252, a corresponding contextual link is assigned to the personalized phrase. In one or more embodiments, processor 205 selectively triggers a contextual response when the personalized phrase is concurrently detected in audio content 310 and passive data 333. The contextual response includes, at least in part, the corresponding operation that is linked to the personalized phrase. For instance, passive data identifies the user has arrived at Union Station at six o'clock in the afternoon, and active data identifies the user desires dinner. The term "dinner" (which represents a general phrase and can have more than one occurrence in PDB 252) has been replaced in PDB 252 with a personalized phrase corresponding to a restaurant at Union Station. Processor IC 205 can, for example, generate a contextual response that includes a reservation request, output a coupon to display 226, and/or output an audible statement that utilizes the personalized phrase and provides corresponding information (i.e. directions, location, hours of operation, menu suggestions, etc).

Within audio processing system 300, processor 205 advantageously links the personalized phrase to the one or more general phrases in a phrase database for the purpose of eventually substituting the general phrase with the personalized phrase. The personalized phrase correlates to one or more general phrases. In one embodiment, substituting the general phrases for personalized phrases increases the speed at which processor 205 completes ASR and associated processing described herein and can reduce the amount of memory utilized. Processing speed of processor 205 can increase because the personalized phrase replaces one or more general phrases reducing the instruction set for processor 205 during automatic speech recognition. Further, replacing the one or more general phrases in PDB 252 can decrease the amount of memory utilized by general phrases.

Figure 4:
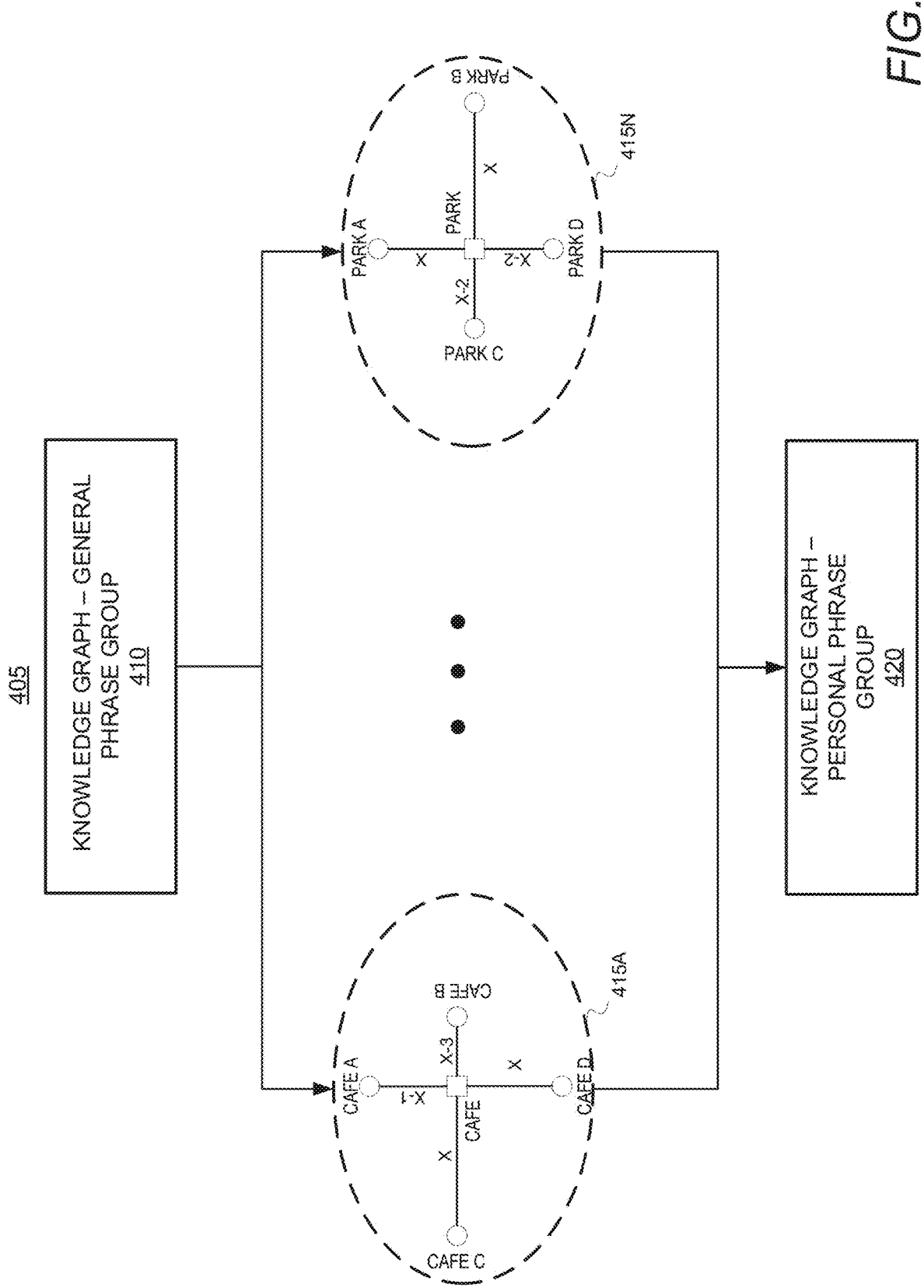
FIG. 4 illustrates an example diagram of a plurality of domain clusters utilized for populating a knowledge graph use by the audio processing system of FIG. 3, according to one or more embodiments.

FIG. 4 illustrates an example diagram of a plurality of domain clusters utilized for populating a knowledge graph utilized by the audio processing system of FIG. 3, according to one or more embodiments. FIG. 4 includes knowledge graph setup 405. Knowledge graph setup 405 includes knowledge graph—general phrase group 410, domain cluster 415A, domain cluster 415N, and knowledge graph—personalized phrase group 420.

Generally, each audio capture device begins with knowledge graph—general phrase group 410, which includes a plurality of general phrases that are stored in PDB 252. In one embodiment, knowledge graph—general phrase group 410 is the same group of phrases for each mobile device. In another embodiment knowledge graph—general phrase group 410 can be selected based on the location of the device setup. For instance, knowledge graph—general phrase group 410 can be pre-configured with phrases germane to a specific country in which the device is located or a country selected by the user during setup of (i) the device and/or (ii) the audio processing features of the device. In response to a personalized phrase being added to PDB 252, processor 205, executing the instruction of PPS 242, determines if the personalized phrase is linked to one or more general phrases in knowledge graph—general phrase group 410. In response to the personalized phrase being linked to one or more general phrases in knowledge graph—general phrase group 410, processor 205 determines how closely correlated the personalized phrase is to one or more general phrases. In one embodiment, processor 205 determines the correlation value between the general phrase and the corresponding personalized phrase based on a merging threshold value. The merging threshold value is pre-established and assigned to the corresponding general phrase during device setup. For example, the personalized phrase "CAFE C" replaces the general word/phrase "CAFE" in PDB 252 when the pre-established merging threshold reaches X number of occurrences within a period of time, t (where X is a determinable variable and t is a pre-determined period of time). A counter associated with buffer 318 counts the number of instances the personalized phrase occurs in active and passive data. In response to the count reaching the predetermined merging threshold, the personalized phrase replaces the general phrase.

The correlation between the personalized phrase and one or more general phrases can also be determined using distances. Domain cluster 415A and domain cluster 415N are example domain clusters for determining when a personalized phrase replaces a general phrase. Each domain cluster 415A and 415N includes a general phrase at the center, and corresponding personalized phrases X distance away. The general phrase is placed at the center of each domain cluster 415A-N. Processor 205 tracks the distance, X, where distance is measured by phrase occurrences and each phrase occurrence is a single instance of a personalized phrase that is being used in place of the general phrase in received active and passive data. Each instance of the personalized phrase in passive and active data within a predetermined timespan decreases the distance between the specific personalized phrase and the general phrase.

In a more specific example, the phrase "CAFE" is in the center of domain cluster 415A. Each time processor 205 stores a new personalized phrase for CAFE in PDB 252, processor 205, executing utility 242, assigns the personalized phrase a predetermined distance X. The predetermined distance X is an assigned distance from the general phrase "CAFE". In this example, "X" is the predetermined distance between the general phrase and the personalized phrase, and X represents the number of times the personalized phrase needs to occur for that personalized phrase to replace the general phrase. Each time the personalized phrase occurs in the active and/or passive data in a determined timespan, processor 205 increases the number of occurrences in buffer 318 and the distance between the respective personalized phrase and the general phrase gets shorter. Therefore, when the incremented number reaches the value of X, processor 205 replaces the general phrase with the respective personalized phrase that is now zero "distance" away from the general phrase. In the example of FIG. 4, in response to the personalized phrase "CAFE B" occurring more in active and passive data than "CAFE A" and "CAFE C", "CAFE B" is closer to replacing the general phrase "CAFE".

Each mobile device 200 begins with the same and/or similarly configured general phrases in the PDB 252. As each user utilizes a respective mobile device (200), PDB 252 for each mobile device 200 will be uniquely configured with personalized phrases associated with the user(s) of the respective device.

Figure 5:
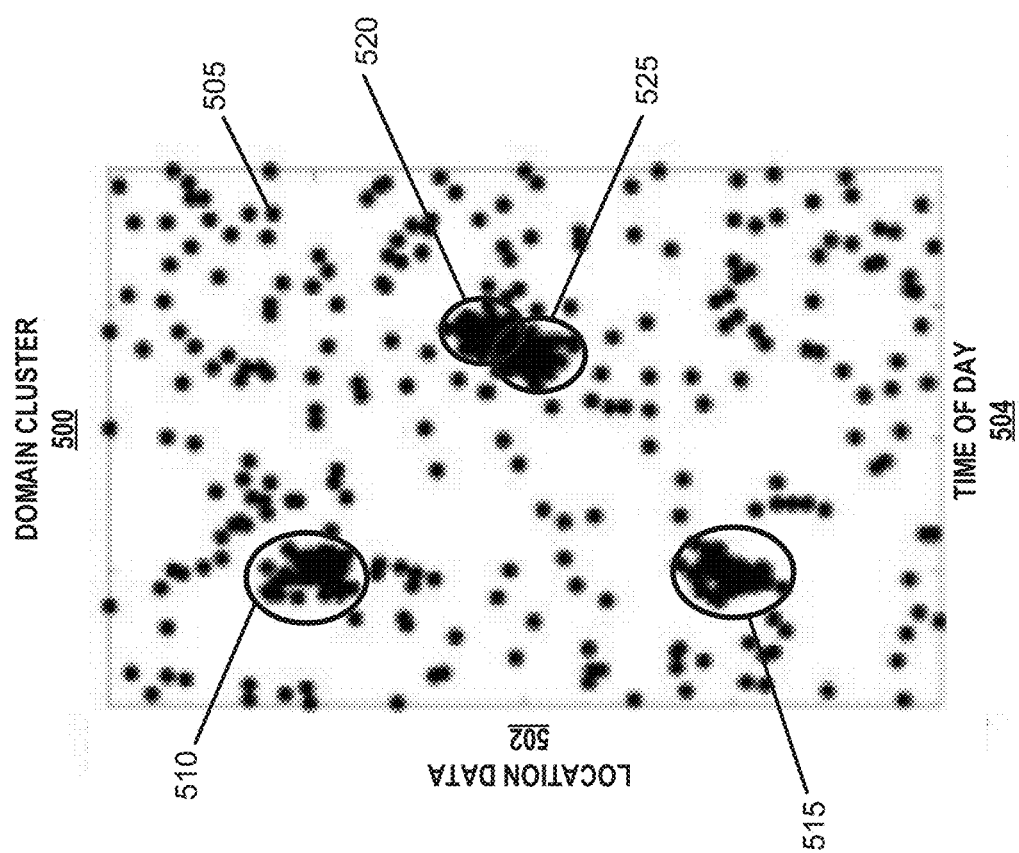
FIG. 5 illustrates an example domain cluster graphical plot displaying word occurrences detected by the mobile device of FIG. 2, according to one or more embodiments.

FIG. 5 illustrates an example domain cluster graphical plot 500 displaying a graphical plot of phrase occurrences detected by mobile device 200 of FIG. 2, according to one or more embodiments. Domain cluster graphical plot 500 includes location data axis 502, time of day axis 504, data point 505, frequent phrase data group A 510, frequent phrase data group B 515, frequent phrase data group C 520, and frequent phrase data group D 525.

Domain cluster graphical plot 500 illustrates a graphical method for determining when to add a personalized phrase to PDB 252. Processor 205 extracts the personalized phrases from the passive data and active data. The passive data has at least one of (i) a historical correlation of data identified by the data processor from networked and non-networked sources and (ii) real-time geographic location information. In one embodiment, in response to extracting personalized phrases from the received active and passive data, each occurrence of a personalized phrase is plotted as data point 505. Data point 505 is placed within domain cluster graphical plot 500 with respect to the location and the time of day of the occurrence. Domain cluster graphical plot 500 illustrates four frequent phrase groups observed using active and passive data, frequent phrase data group A 510, frequent phrase data group B 515, frequent phrase data group C 520, and frequent phrase data group D 525. In response to the area for each respective frequent phrase group exceeding a predetermined area size, the respective frequent phrase is added to PDB 252.

Figure 6:
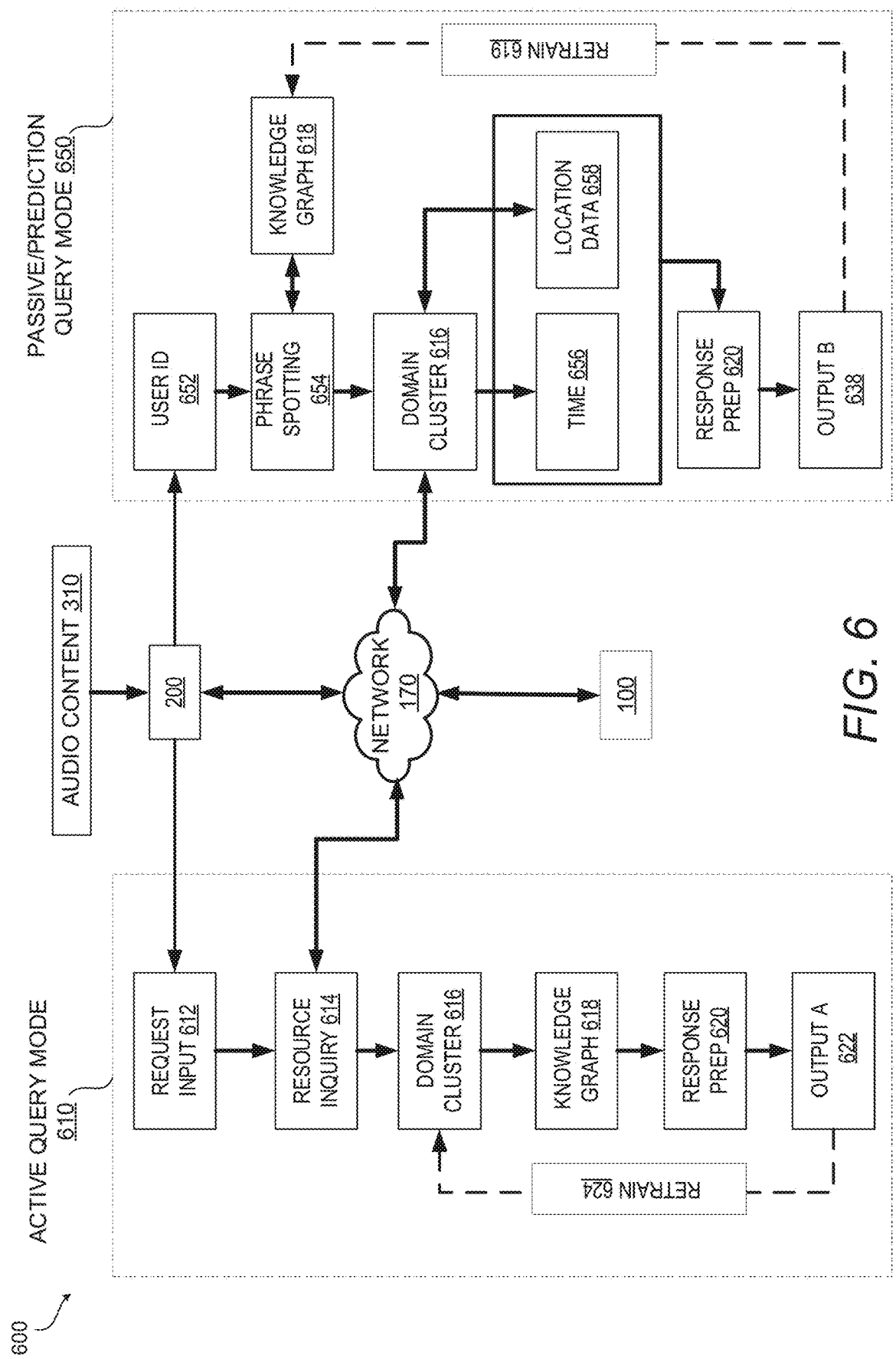
FIG. 6 illustrates an example workflow diagram utilizing an active and passive query mode of the audio processing system of FIG. 3 to identify personalized phrases, according to one or more embodiments.

FIG. 6 illustrates an example workflow diagram 600 utilizing an active and passive query mode of the audio processing system of FIG. 3 to identify personalized phrases, according to one or more embodiments. In workflow diagram 600, mobile device 200 advantageously and contemporaneously utilizes one or both of active query mode 610 and/or passive/prediction query mode 650 to generate a personalized contextual response. Processor 205 initiates active query mode 610 of workflow 600 by triggering request input 612. For example, at workflow block 612, a user actively provides audio content 310 as a requested input to mobile device 200. The user may, for example utilize a personalized wake-up term, or a button to elicit a response from mobile device 200. In another embodiment, a user can selectively trigger the contextual response by stating a personalized phrase for a predetermined number of times within a predefined time span. When the personalized phrase is detected more than the predetermined number of times within a predetermined timespan, processor 205 triggers active query mode 610. In response to the elicitation of the response, mobile device 200 initiates resource inquiry at workflow block 614. Initiating workflow block 614 for a resource inquiry can include extracting the personalized phrases from the active audio content (310) and/or from an audio file. Performing resource inquiry at workflow block 614 further includes identifying data to support the personalized contextual response. For instance, the data can be identified from networked (170) and non-networked sources as well as from real-time geographic location information (e.g., via GPS mod 228). The contextual response can also be generated utilizing a historical correlation of data identified by processor 205. Processor 205 further identifies, by a domain cluster at workflow block 616 and knowledge graph at workflow block 618, when a general phrase detected in audio content 310 is associated with and/or has been replaced by a personalized phrase. In response to identifying a corresponding personalized phrase, at active query mode 610, processor 205 generates a corresponding contextual response that includes the corresponding personalized phrase. In one embodiment, processor 205 generates the contextual response as a text-based contextual response. Audio processing module 208 presents the text-based contextual response to TTS module 335. TTS module 335 outputs audible content that corresponds to the text-based contextual response. In one embodiment, the text-based contextual response is also utilized to retrain the domain cluster. At active query mode 610, output A can provide, for instance, linguistical information and personalized phrases from the query to retrain and/or modify the domain cluster at workflow block 616. In another embodiment, workflow block 624 retrains and updates knowledge graph at workflow block 618.

In passive/prediction query mode 650, a user does not provide a specified wake-up term or push a button to elicit a response or initiate a listening mode. Instead, in passive/prediction query mode 650, mobile device 200 generates a contextual response based on detected speech. The detected speech can be, for instance, rhetorical inquisition, indirect dialog, geographical location, and/or time of day. For example, corresponding to active query mode 610, at block 612, mobile device 200 detects audio content (310) of a user passively stating "Oh, it is raining outside. The kid's soccer game might be cancelled". Corresponding to passive query mode 650, at workflow block 652, processor 205, executing PPS utility 242, automatically activates the automatic speech recognition module in response to identifying, within the audio file of passive audible content (310), one or more spotting phrases at workflow block 654. The spotting phrases in this instance can be "rain", "kid", and "game". Processor 205 extracts personalized phrases at workflow blocks 616 and/or 618, include the passive data that has at least one of (i) a historical correlation of data identified by the data processor from networked and non-networked sources and (ii) real-time geographic location information. Processor 205 extracts the personalized phrases from audio content 310 that is collected from an area proximate to mobile device 200. Further, according to active query mode 610 at workflow block 620, processor 205 activates one or more applications to provide the contextual response. For example, processor 205 activates a calendar, text, and/or email application, and checks the weather according to a weather application, as well as generates a personalized contextual response based on the personalized names associated with the general phrase "kids". Accordingly, processor 205 outputs to a display (226) and/or speaker (262), the personalized contextual response that states "No worries, rains will stop in 10 minutes. Sunshine this afternoon. The soccer game is not cancelled. It is still scheduled for 3 PM".

In another embodiment, according to passive query mode 650 at workflow block 652, processor 205, executing PPS utility 242 (142) differentiates between one or more respective users, based on the one or more acoustic characteristics of audio content 310. Automated speech recognition module 328 is adaptive to the one or more acoustic characteristics of the voice of the respective user. Processor 205 generates a respective, separate personalized phrase database for each one of the respective users. Each separate personalized database generates a different contextual response. Accordingly, at workflow block 654, processor 205 triggers phrase spotting for a specific user, and at workflow block 618, processor 205 searches a knowledge graph with respect to a specific user. In one embodiment, phrase spotting is triggered at workflow block 654 and processor 205 searches a knowledge graph of a respective user. For example, a user makes a passive comment "If I could just remember what my wife wanted for her birthday". A processor of the wife's phone identifies the linguistics as a valid user of the device. Processor 205, responsively searches the personalized knowledge graph at work flow block 618 associated with spotting words "wife, present, gift, birthday". Further, at workflow block 616, processor 205 identifies geographic locations in a respective domain cluster that is associated with information retrieved from the knowledge graph at workflow block 618. As illustrated by workflow block 656 and workflow block 658, the respective domain cluster receives time and location data. At workflow block 620, processor 205 prepares a response and triggers the automated speech recognition module to provide the response to the respective user. In response to differentiating between one or more respective users, processor 205 outputs the different contextual response. The different contextual response comprises outputting a specific contextual response that is specific to the one or more respective users. Responsively, the processor of the wife's phone generates a contextual response stating, "Mark, with you March 7, Emma mentioned pink sweater at Galleria". Processor 205 outputs the contextual response at workflow block 638.

Figure 7:
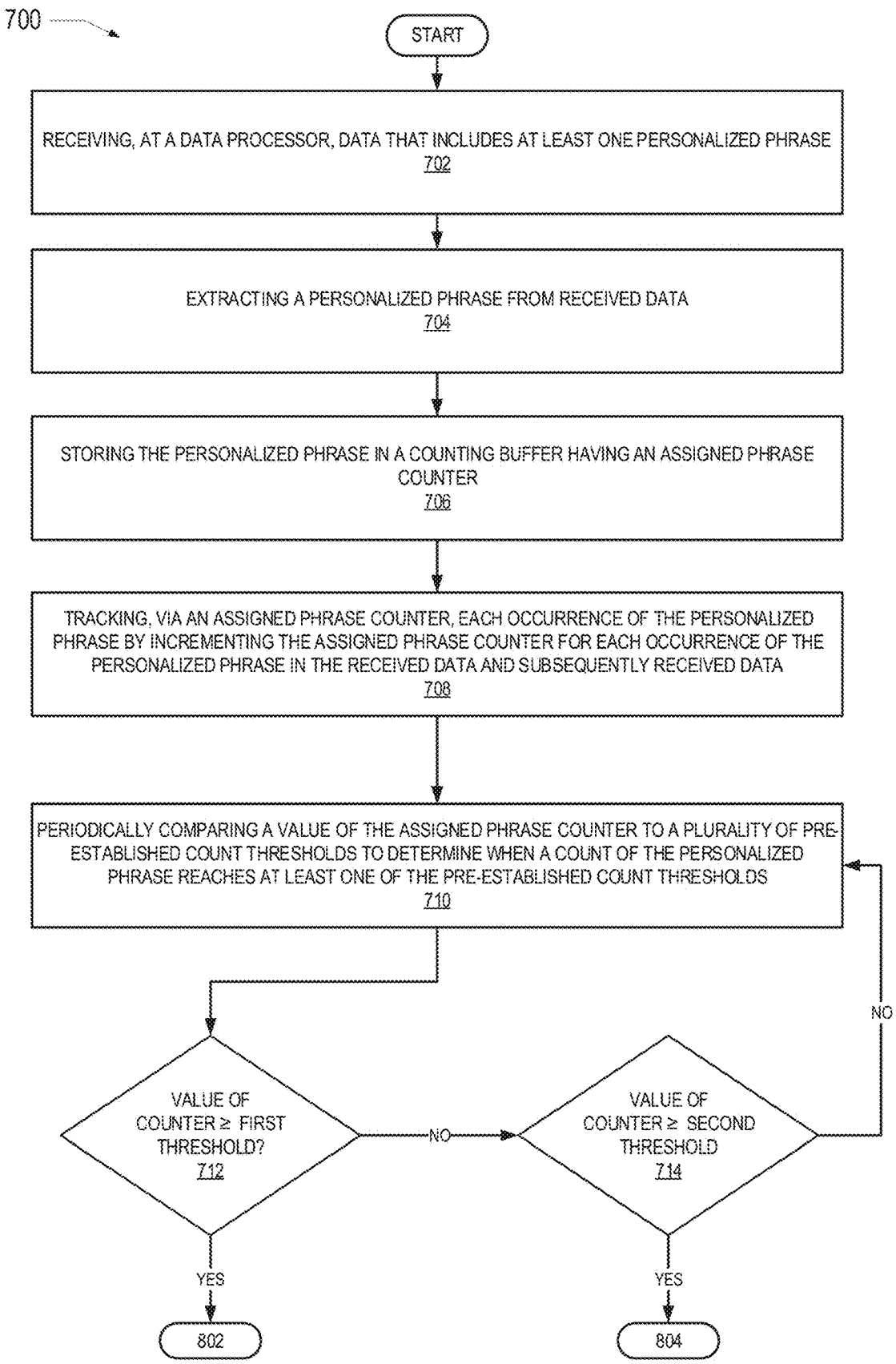
FIG. 7 is a flow chart illustrating a method for utilizing automatic speech recognition and passive data to identify personalized phrases that correlate to one or more generalized phrases, in accordance with one or more embodiments.
Figure 8:
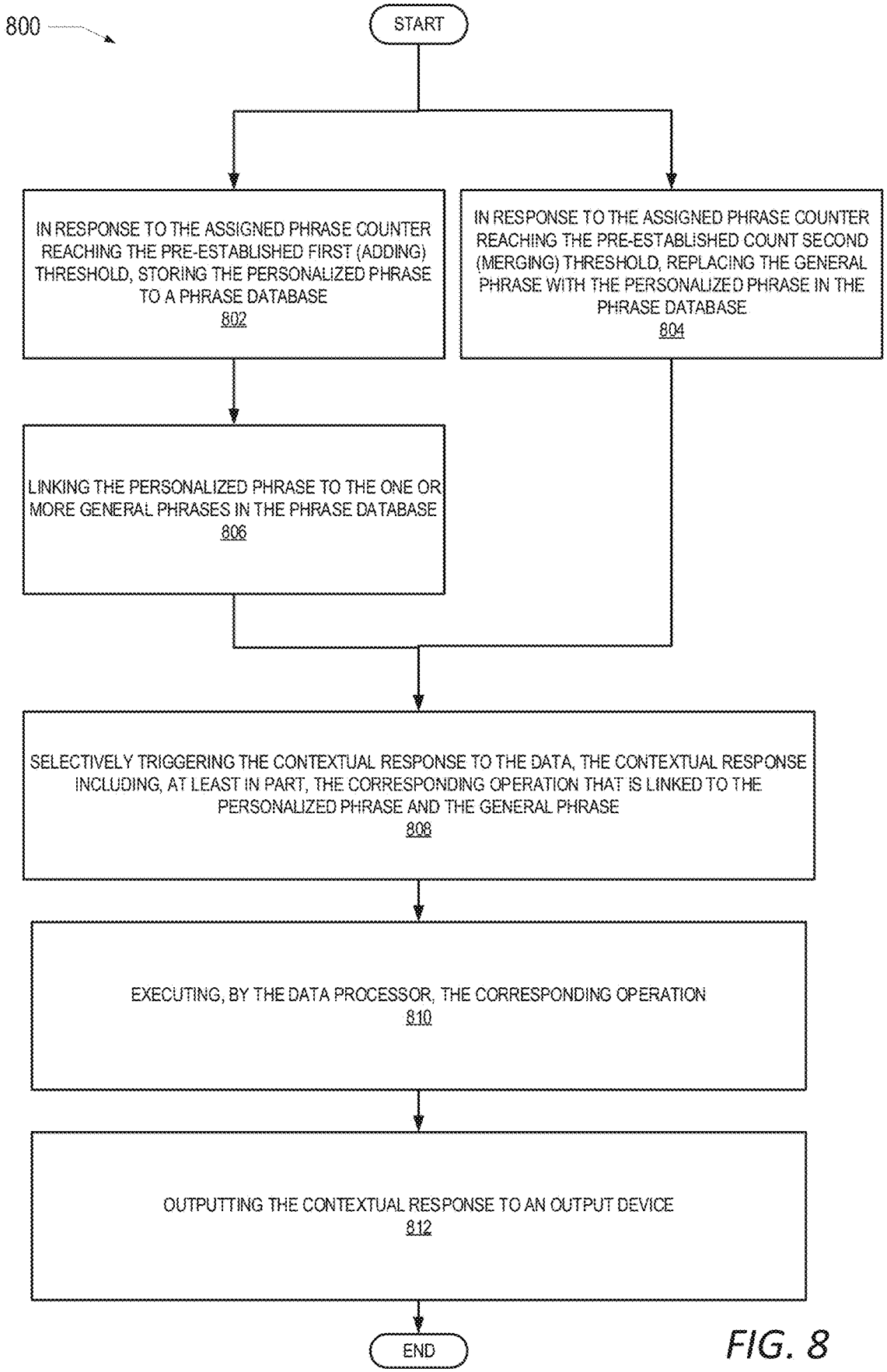
FIG. 8 is a flow chart illustrating a method for triggering a contextual response that is linked to a personalized phrase, in accordance with one or more embodiments.

Referring now to the flow charts of FIGS. 7 and 8. In FIG. 7 there is provided a flow chart illustrating a method for utilizing automatic speech recognition and passive data to identify personalized phrases that correlate to one or more generalized phrases, in accordance with one or more embodiments. In FIG. 8 there is provided a flow chart illustrating a method of triggering a contextual response that is linked to a personalized phrase. Aspects of the methods are described with reference to the components of FIGS. 1-6. Several of the processes of the methods provided in FIGS. 7 and 8 can be implemented by a processor (e.g., processor(s) 105 or processor 205) executing software code of PPS utility 142 or 242. In the following method processes described in FIGS. 7 and 8, processor 105 executes PPS utility 142 and processor 205 executes PPS utility 242 to perform the steps described herein.

Method 700 commences at the start block, then proceeds to block 702. At block 702 processor 205 receives data that includes at least one personalized phrase. Processor 205 extracts a personalized phrase from the received data (block 704). At block 706, processor stores the personalized phrase in a buffer (318) having an assigned phrase counter. Processor 205 tracks, via the assigned phrase counter, each occurrence of the personalize phrase by incrementing the assigned phrase counter for each occurrence of the personalized phrase in the received data and in subsequently received data (block 708). At block 710, processor 205 periodically compares a value of the assigned phrase counter to a plurality of pre-established count thresholds to determine when a count of the personalized phrase reaches at least one of the pre-established count thresholds. At block 712 a processor 205 determines whether the value of the assigned phrase counter reaches the first threshold. In response to the assigned phrase counter reaching the first threshold of the pre-established count thresholds, the process proceeds to block 802. In response to the value of the assigned phrase counter not reaching the first threshold, the process continues to block 714. Processor 205 determines, at block 714, whether the value of the phrase counter reaches a second threshold. In response to the value of the phrase counter reaching the second threshold, the process continues to block 804. In response to the phrase counter not reaching the second threshold, the process returns to block 710.

Method 800 commences at the start block, then proceeds to block 802. At block 802, in response to the assigned phrase counter reaching the pre-established first (adding) threshold, processor 205 stores the personalized phrase to PDB 252. PDB 252 comprises a plurality of phrases from among general and personalized phrases, each linked to a contextual response. The corresponding operation correlates to the received data and the personalized phrases. The personalized phrase correlates to one or more general phrases. The process proceeds to block 804. In response to the assigned phrase counter reaching the pre-established second (merging) threshold, processor 205 replaces the respective general phrase with the corresponding personalized phrase in PDB 252. The process proceeds to block proceeds to block 808. At block 806, processor 205 links the personalized phrase to the one or more general phrases in PDB 252. Processor 205 selectively triggers the contextual response to the data, at block 808. The contextual response includes, at least in part, the corresponding operation that is linked to the personalized phrase. Processor 205 executes the corresponding operation, at block 810. At block 812, processor 205 outputs the contextual response to an output device. The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   receiving, at a data processor, data that includes at least one personalized phrase;
   extracting a personalized phrase from the received data;
   storing the personalized phrase in a buffer having an assigned phrase counter;
   tracking, via the assigned phrase counter, each occurrence of the personalized phrase by incrementing the assigned phrase counter for each occurrence of the personalized phrase in the received data and in subsequently received data;
   periodically comparing a value of the assigned phrase counter to a plurality of pre-established count thresholds to determine when a count of the personalized phrase reaches at least one of the pre-established count thresholds;
   linking the personalized phrase to the one or more general phrases in a phrase database, wherein the personalized phrase correlates to one or more general phrases;
   selectively triggering the contextual response to the data, a contextual response including, at least in part, a corresponding operation that is linked to the personalized phrase;
   executing, by the data processor, the corresponding operation; and
   outputting the contextual response to an output device.

2. The method of claim 1, wherein:
   assigning a pre-established correlation value to the personalized phrase and the one or more general phrases, wherein the correlation value is a quantitative assessment between associative words;
   in response to the assigned phrase counter exceeding a first one of the pre-established count thresholds, storing the personalized phrase to a phrase database, the phrase database comprising a plurality of phrases comprising general phrases and personalized phrases, each linked to the contextual response that includes, at least in part, the corresponding operation that correlates to the received data and the personalized phrase;
   the first one of the pre-established count thresholds comprises an adding threshold having a first value that is based on detection within a predetermined length of time of a pre-established number of occurrences of the personalized phrase in the received data; and
   a second one of the pre-established count thresholds comprises a merging threshold having a second value that is based on the pre-established correlation value between the personalized phrase and the one or more general phrases in the phrase database.

3. The method of claim 2, further comprising:
   tracking a time elapsed from each occurrence of the personalized phrase to the pre-established number of occurrences; and
   wherein triggering modification of the phrase database further comprises replacing a respective stored general phrase in the phrase database with the personalized phrase, in response to a number of occurrences of the personalized phrase exceeding the merging threshold, wherein the personalized phrase becomes a new general phrase.

4. The method of claim 1, further comprising:
   identifying when the received data and the subsequently received data comprise an audio file of active audible content that is captured by a listening device;
   in response to the received data and the subsequently received data comprising the audio file of active audible content, associating the phrase database with an automatic speech recognition module, the phrase database providing one or more spotting phrases from among personalized phrases and general phrases stored within the phrase database; and
   automatically activating the automatic speech recognition module in response to identifying the one or more spotting phrases within the audio file of active audible content.

5. The method of claim 4, further comprising:
storing, with the personalized phrases in the phrase database, one or more acoustic characteristics of a voice of a respective user;
differentiating between one or more respective users, based on the one or more acoustic characteristics; and
triggering an automated speech recognition module to respond to a respective user, wherein the automated speech recognition module is adaptive to the one or more acoustic characteristics of the voice of the respective user.

6. The method of claim 4, wherein the received data and the subsequently received data includes one or more of passive data and an audio file, the method further comprising:
extracting the personalized phrases from passive data that has at least one of (i) a historical correlation of data identified by the data processor from networked and non-networked sources and (ii) real-time geographic location information; and
extracting the personalized phrases from the audio file when the audio file is a sample of active audio content collected from an area proximate to the listening device.

7. The method of claim 6, further comprising:
activating one or more applications to provide the contextual response, the one or more applications providing one of a dynamically determined and a predetermined operation that corresponds to one or more personalized phrases and general phrases within the phrase database, the passive data, and the audio file.

8. The method of the claim 4, further comprising:
in response to differentiating between one or more respective users, generating a respective, separate personalized phrase database for each one of the respective users, wherein each separate personalized database generates a different contextual response; and
outputting a specific contextual response that is specific to the one or more respective users associated with the received data.

9. The method of claim 1, wherein selectively triggering the contextual response to the data further comprises selectively triggering the contextual response to the data in response to the personalized phrase being detected more than a predetermined number of times within a predetermined timespan.

10. The method of claim 1, further comprising:
generating the contextual response as a text-based contextual response;
presenting the text-based contextual response to a text-to-sound module; and
outputting, via the text-to-sound module, audible content that corresponds to the text-based contextual response.

11. A data processing device comprising:
a listening device that receives data; and
a processor that is communicatively coupled to the listening device, the processor executing a personalized phrase spotting utility, which configures the processor to:
receive, at a data processor, data that includes at least one personalized phrase;
extract a personalized phrase from received data;
store the personalized phrase in a counting buffer having an assigned phrase counter;
track, via the assigned phrase counter, each occurrence of the personalized phrase by incrementing the assigned phrase counter for each occurrence of the personalized phrase in the received data and subsequently received data;
periodically compare a value of the assigned phrase counter to a plurality of pre-established count thresholds to determine when a count of the personalized phrase reaches at least one of the pre-established count thresholds;
link the personalized phrase to the one or more general phrases in a phrase database, wherein the personalized phrase correlates to one or more general phrases;
selectively trigger the contextual response to the data, the contextual response including, at least in part, the corresponding operation that is linked to the personalized phrase;
execute, by the data processor, the corresponding operation; and
output the contextual response to an output device.

12. The data processing device of claim 11, the processor executing a personalized phrase spotting utility, further configures the processor to:
in response to the assigned phrase counter exceeding the pre-established count threshold, store the personalized phrase to a phrase database, the phrase database comprising a plurality of phrases from among general phrases and personalized phrases, each linked to a contextual response that includes, at least in part, a corresponding operation that correlates to the received data and the personalized phrase, wherein the personalized phrase correlates to one or more general phrases;
assign a pre-established correlation value to the personalized phrase and the one or more general phrases, wherein the correlation value is a quantitative assessment between associative words;
select a pre-established count threshold, from among the plurality of pre-established count thresholds, the first one of the pre-established count thresholds comprises an adding threshold having a first value that is based on detection within a predetermined length of time of a pre-established number of occurrences of the personalized phrase in the received data; and a second one of the pre-established count thresholds comprises a merging threshold having a second value that is based on the pre-established correlation value between the personalized phrase and the one or more general phrases in the phrase database;
track a time elapsed from each occurrence of the personalized phrase to the pre-established number of occurrences; and
replace a respective stored general phrase in the phrase database with the personalized phrase, in response to a number of occurrences of the personalized phrase exceeding the merging threshold, wherein the personalized phrase becomes a new general phrase.

13. The data processing device of claim 11, wherein the processor executing a personalized phrase spotting utility, further configures the processor to:
identify when the received data and the subsequently received data comprises an audio file of active audible content that is captured by a listening device, wherein the received data and the subsequently received data includes one or more of passive data and an audio file;
in response to the received data and the subsequently received data comprising the audio file of active audible content that, associate the phrase database with an automatic speech recognition module, the phrase database providing one or more spotting phrases from among personalized phrases and general phrases stored within the phrase database;

automatically activate the automatic speech recognition module in response to identifying the one or more spotting phrases, within the audio file of active audible content;

store, with the personalized phrase in the phrase database, one or more acoustic characteristics of a voice of a respective user;

differentiate between one or more respective users, based on the one or more acoustic characteristics; and trigger an automated speech recognition module to respond to a respective user, wherein the automated speech recognition module is adaptive to the one or more acoustic characteristics of the voice of the respective user.

14. The data processing device of claim 13, wherein the processor executing a personalized phrase spotting utility, further configures the processor to:

extract the personalized phrase from passive data that has at least one of (i) a historical correlation of data identified by the data processor from networked and non-networked sources and (ii) real-time geographic location information;

extract the personalized phrase from the audio file when the audio file is a sample of active audio content collected from an area proximate to the listening device;

activate one or more applications to provide the contextual response, the one or more applications providing one of a dynamically determined and a predetermined operation that corresponds to one or more personalized phrases and general phrases within the phrase database, the passive data, and the audio file;

in response to differentiating between one or more respective users, generate a respective, separate personalized phrase database for each one of the respective users, wherein each separate personalized database generates a different contextual response; and output a specific contextual response that is specific to the one or more respective users associated with the received data.

15. The data processing device of claim 11, wherein the processor executing a personalized phrase spotting utility, further configures the processor to:

selectively trigger the contextual response to the data in response to the personalized phrase being detected more than a predetermined number of times within a predetermined timespan;

generate the contextual response as a text-based contextual response;

present the text-based contextual response to a text-to-sound module; and output, via the text-to-sound module, audible content that corresponds to the text-based contextual response.

16. A computer program product comprising:

a computer readable storage device; and program code on the computer readable storage device that when executed within a processor associated with a device, the program code enables the device to perform functions of:

receiving, at a data processor, data that includes at least one personalized phrase;

extracting a personalized phrase from received data;

storing the personalized phrase in a counting buffer having an assigned phrase counter;

tracking, via the assigned phrase counter, each occurrence of the personalized phrase by incrementing the assigned phrase counter for each occurrence of the personalized phrase in the received data and subsequently received data;

periodically comparing a value of the assigned phrase counter to a plurality of pre-established count thresholds to determine when a count of the personalized phrase reaches at least one of the pre-established count thresholds;

linking the personalized phrase to the one or more general phrases in the phrase database, wherein the personalized phrase correlates to one or more general phrases;

selectively triggering the contextual response to the data, the contextual response including, at least in part, the corresponding operation that is linked to the personalized phrase;

executing, by the data processor, the corresponding operation; and outputting the contextual response to an output device.

17. The computer program product of claim 16, wherein the program code further comprise program code that enables the device to provide functionality comprising:

in response to the assigned phrase counter exceeding the pre-established count threshold, storing the personalized phrase to a phrase database, the phrase database comprising a plurality of phrases from among general phrases and personalized phrases, each linked to a contextual response that includes, at least in part, a corresponding operation that correlates to the received data and the personalized phrase, wherein the personalized phrase correlates to one or more general phrases;

assigning a pre-established correlation value to the personalized phrase and the one or more general phrases, wherein the pre-established correlation value is a quantitative assessment between associative words;

selecting a pre-established count threshold, from among the plurality of pre-established count thresholds, the first one of the pre-established count thresholds comprises an adding threshold having a first value that is based on detection within a predetermined length of time of a pre-established number of occurrences of the personalized phrase in the received data; and a second one of the pre-established count thresholds comprises a merging threshold having a second value that is based on the pre-established correlation value between the personalized phrase and the one or more general phrases in the phrase database;

tracking a time elapsed from each occurrence of the personalized phrase to the pre-established number of occurrences; and replacing a respective stored general phrase in the phrase database with the personalized phrase, in response to a number of occurrences of the personalized phrase exceeding the merging threshold, wherein the personalized phrase becomes a new general phrase.

18. The computer program product of claim 16, wherein the program code further comprise program code that enables the device to provide functionality comprising:

identifying when the received data and the subsequently received data comprises an audio file of active audible content that is captured by a listening device;

in response to the received data and the subsequently received data comprising the audio file of active audible content, associating the phrase database with an automatic speech recognition module, the phrase database providing one or more spotting phrases from among personalized phrases and general phrases stored within the phrase database;

automatically activating the automatic speech recognition module in response to identifying the one or more spotting phrases, within the audio file of active audible content;

storing, with the personalized phrases in the phrase database, one or more acoustic characteristics of a voice of a respective user;

differentiating between one or more respective users, based on the one or more acoustic characteristics; and triggering an automated speech recognition module to respond to a respective user, wherein the automated speech recognition module is adaptive to the one or more acoustic characteristics of the voice of the respective user.

19. The computer program product of claim 18, wherein the program code further comprise program code that enables the device to provide functionality comprising:

extracting the personalized phrases from passive data that has at least one of (i) a historical correlation of data identified by the data processor from networked and non-networked sources and (ii) real-time geographic location information;

extracting the personalized phrases from the audio file when the audio file is a sample of active audio content collected from an area proximate to the listening device;

activating one or more applications to provide the contextual response, the one or more applications providing one of a dynamically determined and a predetermined operation that corresponds to one or more personalized phrases and general phrases within the phrase database, the passive data, and the audio file;

in response to differentiating between one or more respective users, generating a respective, separate personalized phrase database for each one of the respective users, wherein each separate personalized database generates a different contextual response; and outputting a specific contextual response that is specific to the one or more respective users associated with the received data.

20. The computer program product of claim 16, wherein the program code further comprise program code that enables the device to provide functionality comprising:

selectively triggering the contextual response to the data in response to the personalized phrase being detected more than a predetermined number of times within a predetermined timespan;

generating the contextual response as a text-based contextual response;

presenting the text-based contextual response to a text-to-sound module; and outputting, via the text-to-sound module, audible content that corresponds to the text-based contextual response.

* * * * *